(12) United States Patent
Ooba

(10) Patent No.: US 10,521,871 B2
(45) Date of Patent: Dec. 31, 2019

(54) ROBOT SYSTEM

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 28 days.

(21) Appl. No.: 16/028,973

(22) Filed: Jul. 6, 2018

(65) Prior Publication Data

US 2019/0015973 A1  Jan. 17, 2019

(30) Foreign Application Priority Data

Jul. 12, 2017 (JP) .................................. 2017-136140
Jun. 15, 2018 (JP) .................................. 2018-114237

(51) Int. Cl.
| | |
|---|---|
| *B25J 9/16* | (2006.01) |
| *G06T 1/00* | (2006.01) |
| *B25J 9/00* | (2006.01) |
| *B65G 47/52* | (2006.01) |
| *G06K 9/20* | (2006.01) |

(52) U.S. Cl.
CPC ........... *G06T 1/0014* (2013.01); *B25J 9/0093* (2013.01); *B25J 9/1697* (2013.01); *B65G 47/52* (2013.01); *G06K 9/20* (2013.01); *G06T 1/0007* (2013.01)

(58) Field of Classification Search
CPC .................................................. G06T 1/0014
See application file for complete search history.

(56) References Cited

U.S. PATENT DOCUMENTS

| | | | |
|---|---|---|---|
| 10,185,857 B2 * | 1/2019 | Gutfinger | G06K 7/1413 |
| 2006/0016066 A1 * | 1/2006 | Gaida | H05K 13/0815 |
| | | | 29/740 |
| 2010/0014784 A1 * | 1/2010 | Silverbrook | G06K 9/228 |
| | | | 382/313 |
| 2012/0236140 A1 | 9/2012 | Hazeyama et al. | |
| 2013/0329954 A1 * | 12/2013 | Ikeda | G06T 1/0007 |
| | | | 382/103 |

(Continued)

FOREIGN PATENT DOCUMENTS

| | | |
|---|---|---|
| EP | 2500147 A2 | 9/2012 |
| JP | 2009-28818 A | 2/2009 |

(Continued)

OTHER PUBLICATIONS

Japanese Office Action dated Sep. 17, 2019, in connection with corresponding JP Application No. 2018-114237 (9 pgs., including machine-generated English translation).

*Primary Examiner* — Thomas Randazzo
(74) *Attorney, Agent, or Firm* — Maier & Maier, PLLC

(57) ABSTRACT

A robot system including a conveying apparatus that conveys an object; a robot that performs a process on the object being conveyed; a visual sensor that acquires visual information about the object; a high-frequency processing unit that detects at least one of a conveying velocity at which the object is being conveyed by the conveying apparatus and a position of the object by processing, at a first frequency, the visual information; a low-frequency processing unit that detects a position of the object by processing, at a second frequency that is lower than the first frequency, the visual information; and a control unit that controls the robot.

6 Claims, 7 Drawing Sheets

(56) References Cited

U.S. PATENT DOCUMENTS

| | | | | |
|---|---|---|---|---|
| 2016/0001983 A1* | 1/2016 | Ooba | ............... | B65G 37/00 |
| | | | | 414/787 |
| 2016/0104021 A1* | 4/2016 | Negro | ............... | G06K 7/1443 |
| | | | | 235/462.08 |
| 2016/0151916 A1* | 6/2016 | Kanno | ............... | B25J 9/1697 |
| | | | | 700/228 |
| 2018/0114323 A1* | 4/2018 | Hatstat | ............... | G06K 7/1413 |

FOREIGN PATENT DOCUMENTS

| | | |
|---|---|---|
| JP | 2012-192466 A | 10/2012 |
| JP | 2016-107349 | 6/2016 |

\* cited by examiner

ROBOT SYSTEM

CROSS-REFERENCE TO RELATED APPLICATIONS

This application is based on and claims priority to Japanese Patent Application No. 2017-136140 filed on Jul. 12, 2017 and Japanese Patent Application No. 2018-114237 filed on Jun. 15, 2018, the entire content of which are incorporated herein by reference.

FIELD

The present invention relates to a robot system.

BACKGROUND

In the related art, there is a known robot system with which an object being conveyed by a conveyor or a mark made on the conveyor is imaged, the moving velocity of the object conveyed by the conveyor is detected on the basis of the obtained image, and the position of a robot hand is controlled in synchronization with the movement of the object, thereby gripping the moving object with the robot hand (for example, see PTL 1).

Also, there is a known robot system in which a workpiece on a conveyor is identified on the basis of an image acquired by a visual sensor in synchronization with a signal from an encoder that detects an amount by which the conveyor is moved in a conveying route, and the workpiece is handled by adjusting the position of the hand to the identified workpiece, wherein the hand is attached to a distal end of a robot (for example, see PTL 2).

{PTL 1} Japanese Unexamined Patent Application, Publication No. 2009-28818
{PTL 2} Japanese Unexamined Patent Application, Publication No. 2012-192466

SUMMARY

An aspect of the present invention provides a robot system including: a conveying apparatus that conveys an object; a robot that performs a process on the object being conveyed by the conveying apparatus; a visual sensor that acquires visual information about the object being conveyed by the conveying apparatus; a high-frequency processing unit that detects at least one of a conveying velocity at which the object is being conveyed by the conveying apparatus and a position of the object by processing, at a first frequency, the visual information acquired by the visual sensor; a low-frequency processing unit that detects a position of the object by processing, at a second frequency that is lower than the first frequency, the visual information acquired by the visual sensor; and a control unit that controls the robot on the basis of at least one of the conveying velocity and the position of the object detected by the high-frequency processing unit, and on the basis of the position of the object detected by the low-frequency processing unit.

DETAILED DESCRIPTION

A robot system 1 according to an embodiment of the present invention will be described below with reference to the drawings.

Figure 1:
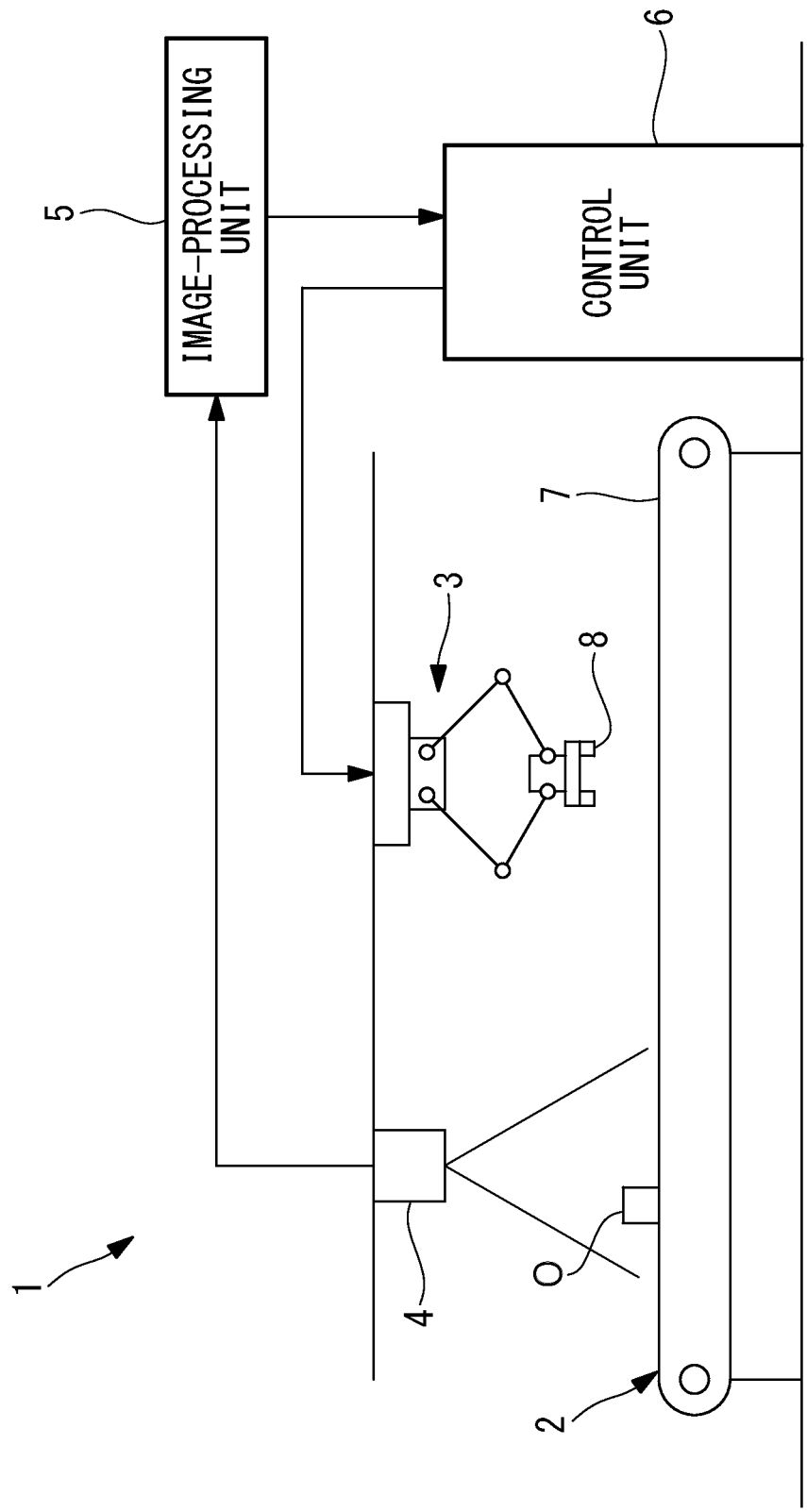
FIG. 1 is an overall configuration diagram showing a robot system according to an embodiment of the present invention.

As shown in FIG. 1, the robot system 1 according to this embodiment is provided with: a conveyor (conveying apparatus) 2 that conveys an article O as an object; a robot 3 that is installed in the vicinity of the conveyor 2; a two-dimensional camera (visual sensor) 4 that is installed, facing down, above the conveyor 2 at a position that is on an upstream side of the robot 3 in a conveying direction; an image-processing unit 5 that processes the images acquired by the two-dimensional camera 4; and a control unit 6 that controls the robot 3 on the basis of images processed by the image-processing unit 5.

The conveyor 2 is, for example, a belt conveyor, and is provided with a belt 7 on which the article O is placed and conveyed in one direction. The belt 7 is driven by a motor (not shown).

Although the robot 3 may be of an arbitrary type, such as a floor-mounted type, a suspended type, or the like, the robot 3 has, for example, a robot hand 8 that can grip the article O at a distal end of a wrist thereof.

The two-dimensional camera 4 has a viewing field that is fixed in a certain region of the conveyor 2 in the conveying direction, and acquires two-dimensional images of the article O being conveyed on the conveyor 2. The two-dimensional camera 4 is configured, for example, so as to acquire two-dimensional images (visual information) at a high frequency (first frequency) of 1 millisecond and output the two-dimensional images to the image-processing unit 5, and so as also to output the two-dimensional images in response to externally input triggers.

Figure 2:
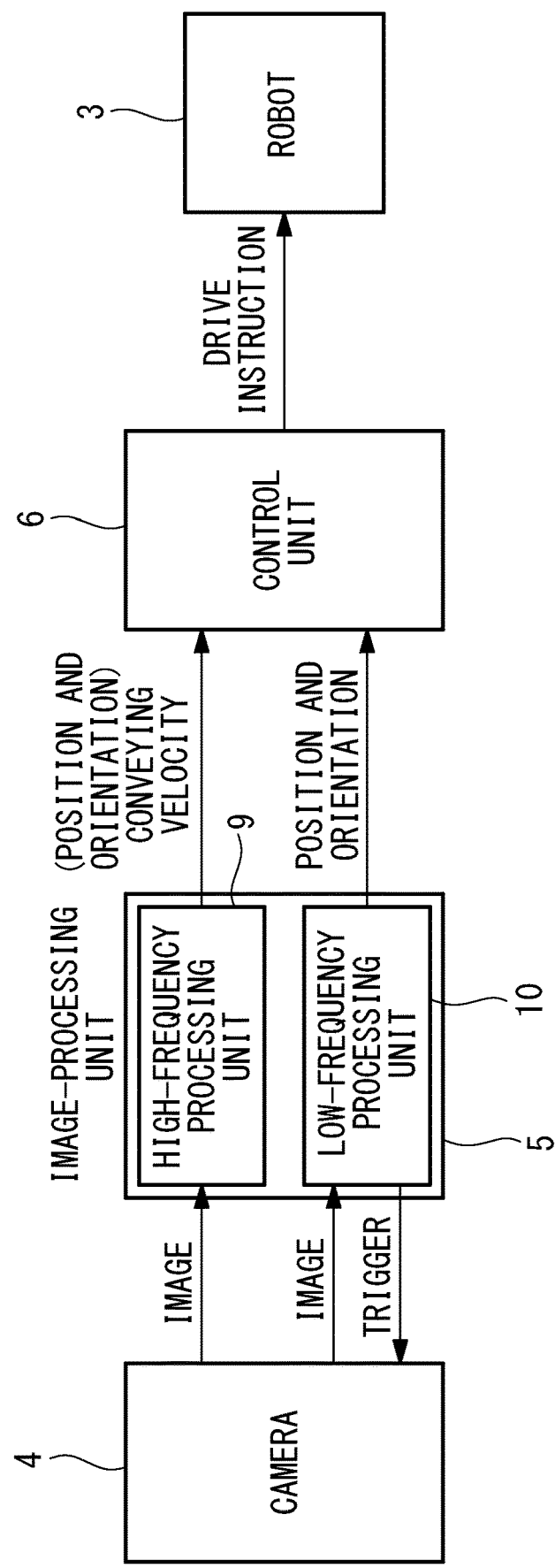
FIG. 2 is a block diagram showing the robot system in FIG. 1.

As shown in FIG. 2, the image-processing unit 5 is provided with: a high-frequency processing unit 9 that applies image processing to portions of the acquired two-dimensional images at the first frequency; and a low-frequency processing unit 10 that applies image processing to the acquired two-dimensional images at a second frequency that is lower than the first frequency.

The high-frequency processing unit 9 calculates the positions of the gravity centers of the articles O included in the respective two-dimensional images transmitted thereto at the first frequency, and calculates the velocity at which the articles O are conveyed by the conveyor 2, on the basis of the displacement of the positions of the gravity centers of the articles O in the two-dimensional images acquired at different times.

The low-frequency processing unit 10 applies imaging processing, such as pattern matching or the like, to the two-dimensional images output from the two-dimensional camera 4, and detects the positions and orientations of the articles O included in the two-dimensional images.

The control unit 6 generates drive signals (drive instructions) for controlling the robot 3 on the basis of the velocities at which the articles O are conveyed by the conveyor 2, which are calculated on the basis of the positions of an identical article O recognized by high-frequency processing unit 9 on the basis of the images acquired at different times, and the positions and orientations of the articles O detected by the low-frequency processing unit 10.

For example, the control unit 6 determines the current position of an article O by successively accumulating, every 1 millisecond, the amount by which the conveyor 2 is moved by using the velocity at which the article O is conveyed by the conveyor 2 calculated by the high-frequency processing unit 9, starting from the moment at which the low-frequency processing unit 10 detects the position and orientation of the article O, and thus, the control unit 6 outputs the drive signals in accordance with the current position of the article O to the robot 3.

If there is a case in which the article O is temporarily not recognized, the amount by which the conveyor 2 is moved is calculated by using the velocity at which the article O was conveyed by the conveyor 2 immediately therebefore.

The control unit 6 controls the robot 3 to be operated in accordance with an operating program taught thereto in advance, and controls the robot 3 to perform process for gripping the article O being moved by the conveyor 2 and picking the article O from the conveyor 2 by using the robot hand 8 by executing tracking with which the article O on the conveyor 2 is followed on the basis of the conveying velocity calculated by the high-frequency processing unit 9 and by changing the orientation of the robot hand 8 in accordance with the position and the orientation of the article O detected by the low-frequency processing unit 10.

Figure 3:
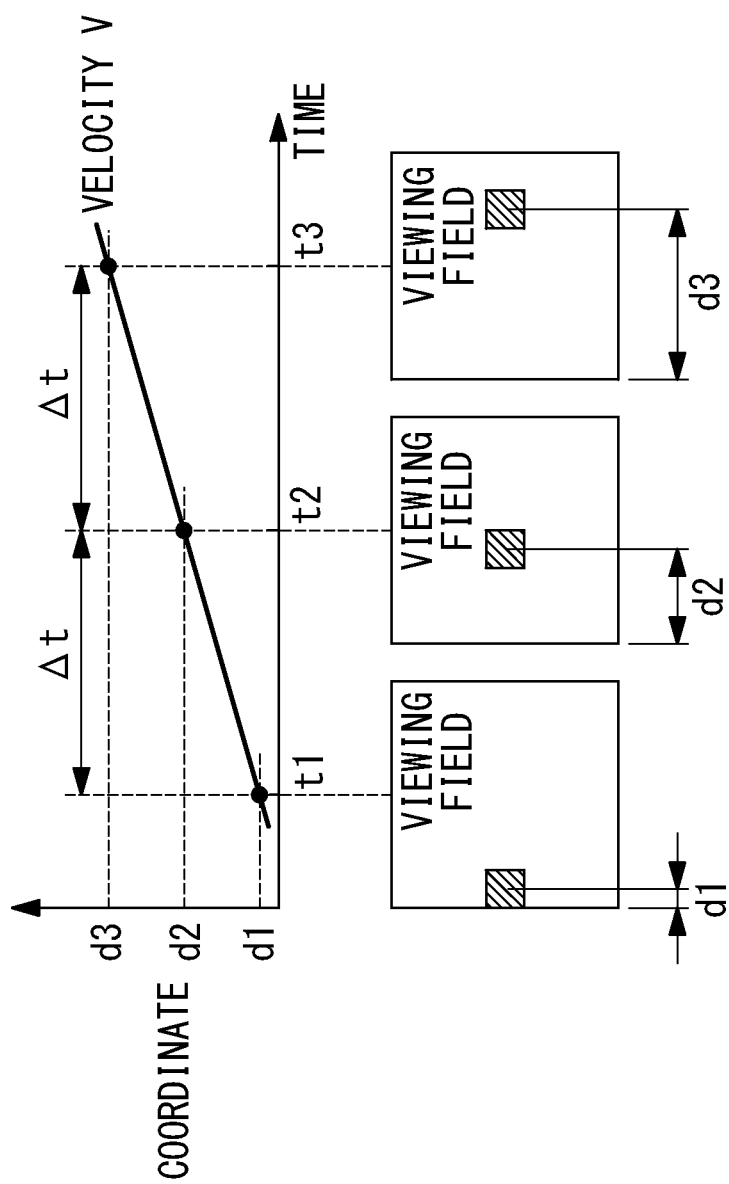
FIG. 3 is a diagram showing changes over time in images acquired by a camera of the robot system in FIG. 1 and the conveying velocity.

Specifically, for example, as shown in FIG. 3, when three images are acquired in the same viewing field at different times t1, t2, and t3 separated by a first-frequency time interval Δt, the high-frequency processing unit 9 detects the position of the article O by performing simple image processing having a low processing load (for example, processing for detecting the position of the gravity centers and blob detecting processing), and calculates coordinate positions d1, d2, and d3 of the gravity center of the detected article O. In the figure, velocity V is the velocity at which the article O is conveyed.

Also, the high-frequency processing unit 9 recognizes, as an identical article O, the articles O having the gravity centers positioned on the same coordinate in a direction orthogonal to the conveying direction in the images acquired consecutively in the time-axis direction, and calculates the conveying velocity by dividing the differences between the coordinate values of the gravity centers of the respective articles O in the conveying direction by the time interval Δt for capturing the images. When the conveying velocity is calculated multiple times for the identical article O, an average thereof or a value fitted by means of the least squares method or the like is output as the conveying velocity.

In this case, in the processing for detecting the position of the gravity center of the articles O, which is repeatedly performed at the first frequency, the high-frequency processing unit 9 defines a partial region that includes one of the articles O, and sequentially detects the positions of the gravity center by performing image processing on the portions of the images identified by the partial region instead of the entire images transmitted from the two-dimensional camera 4. It is, of course, possible to use the entire images.

In that case, however, the processing load is increased as compared to the case in which portions of the images are used.

On the other hand, the low-frequency processing unit 10 performs, on the images transmitted thereto from the two-dimensional camera 4, image processing with a high processing load (for example, processing for detecting the position and orientation of the article O by means of pattern matching on the basis of the outline of the article O), and outputs the detected position and orientation of the article O to the control unit 6.

The operation of the thus-configured robot system according to this embodiment will be described below.

With the robot system 1 according to this embodiment, when the article O is being conveyed by the conveyor 2, the two-dimensional camera 4 captures the images of the article O. The images acquired by image-capturing are sequentially transmitted to the high-frequency processing unit 9 of the image-processing unit 5, and, in accordance with the triggers output from the low-frequency processing unit 10 at the second frequency, the images acquired immediately before (or immediately after) receiving the triggers are also transmitted to the low-frequency processing unit 10.

In the high-frequency processing unit 9, by applying image processing with a relatively low processing load to the respective images transmitted thereto from the two-dimensional camera 4, the article O therein is recognized, and the coordinate positions d1, d2, and d3 of the gravity center of the article O are detected on the basis of partial images of areas including the article O. Then, as shown in FIG. 3, on the basis of the coordinate positions d1, d2, and d3 of the gravity centers of the identical article O, which are detected on the basis of the images acquired at different times t1, t2, and t3 separated by the predetermined time intervals Δt, the velocity at which the article O is conveyed by the conveyor 2 is calculated at the first frequency and is input to the control unit 6. Because the two-dimensional camera 4 and the robot 3 are disposed at positions that are separated by a predetermined distance, the article O moves into an operating area of the robot 3 when the amount of time obtained by dividing this distance by the conveying velocity has passed.

In the low-frequency processing unit 10, by applying image processing with a high processing load, such as pattern matching or the like, at the second frequency that is lower than the first frequency to the respective images transmitted thereto from the two-dimensional camera 4 in accordance with the triggers, the position and orientation of the article O are detected on the basis of the entire image with a highly precise manner and are input to the control unit 6.

The control unit 6 sets a tracking coordinate system TF by recognizing the position and orientation of the article O at one of the points in time at which the article O exists in the images, and calculates the amounts by which the position of the gravity center of the article O is moved between the moment at which the article O is recognized and the current time by determining the amount by which the conveyor 2 is moved on the basis of the velocity at which the article O is conveyed by the conveyor 2 every timing of the first frequency (for example, 1 millisecond), and by accumulating the obtained movement amounts. Then, a current tracking coordinate system TF' is calculated by multiplying the tracking coordinate system TF by a coordinate transformation matrix having said movement amounts as elements thereof.

$TF'=T\cdot TF$

Thus, the control unit 6 can cause the robot hand 8 to be moved so as to follow, based on the calculated tracking coordinate system TF', the article O being conveyed by the conveyor 2, and can also set the position and orientation of the robot hand 8 in accordance with the position and orientation of the recognized article O, thus causing the robot hand 8 to grip the article O and to pick the article O from the conveyor 2.

In this case, when the robot 3 is being driven so that the robot hand 8 follows the article O on the conveyor 2, because the two-dimensional camera 4 captures images of subsequent articles O, and new conveying velocity is calculated by the high-frequency processing unit 9, the control unit 6 controls the robot 3 by using the newly calculated conveying velocity. By doing so, it is possible to correctly pick the article O even if the conveying velocity of the conveyor 2 fluctuates.

As has been described above, with the robot system 1 according to this embodiment, it is possible to detect, at a resolution that is equivalent to that of the encoder, the velocity at which the article O is moved, which can be detected by means of processing with a relatively low processing load at the first frequency, which is a high frequency, and it is possible to cause the robot 3 to perform the tracking operation for the article O being conveyed. Regarding the detection of the position and orientation of the article O, which requires processing with a relatively high processing load, highly precise detection is possible by executing the processing at the second frequency, which is lower than the first frequency, and thus, there is an advantage in that it is possible to cause the robot hand 8 to more reliably grip the article O by adjusting the orientation of the robot hand 8 so as to precisely align with the orientation of the article O.

Also, because the moving velocity, position, and orientation of the article O are detected in this way by using the single two-dimensional camera 4, there is an advantage in that it is possible to achieve a cost reduction.

By using, in the high-frequency processing unit 9, portions of the images transmitted thereto from the two-dimensional camera 4 in order to detect the moving velocity of the article O, it is possible to simplify the high-frequency processing by reducing the processing load.

As a result, as indicated by parenthesis in FIG. 2, it is possible to detect the rough position and orientation of the article O in the high-frequency processing unit 9. It is possible to detect, for example, a longitudinal direction of the article O, a rough shape of a blob, etc. Also, by inputting, to the control unit 6, the rough position and orientation of the article O detected in this way, the control unit 6 can start the operation of the robot 3 on the basis of the information about the rough position and orientation of the article O transmitted thereto at the first frequency from the high-frequency processing unit 9 without having to wait for the highly precise information about the position and orientation of the article O transmitted thereto at the second frequency from the low-frequency processing unit 10, and thus, there is an advantage in that it is possible to further facilitate tracking.

Although the partial regions including the article O are used as the portions of the images transmitted from the two-dimensional camera 4, alternatively, the amount of information may be reduced by thinning pixels from the images transmitted from the two-dimensional camera 4.

In this embodiment, although the two-dimensional camera 4 has been described as an example of the visual sensor that acquires the visual information, there is no limitation thereto, and a three-dimensional camera or other types of visual sensors may be employed.

In this embodiment, although the conveying velocity of the conveyor 2 is calculated on the basis of changes in the positions of the article O being conveyed by the conveyor 2, alternatively, marks may be provided on the surface of the conveyor 2 at appropriate intervals, and the conveying velocity may be calculated on the basis of changes in the positions of the marks by recognizing the marks included in the images acquired by the two-dimensional camera 4.

In this case, the marks are useful for calculating the moving velocity, because the marks are continuously supplied into the viewing field of the two-dimensional camera 4 in a more reliable manner.

Figure 4:
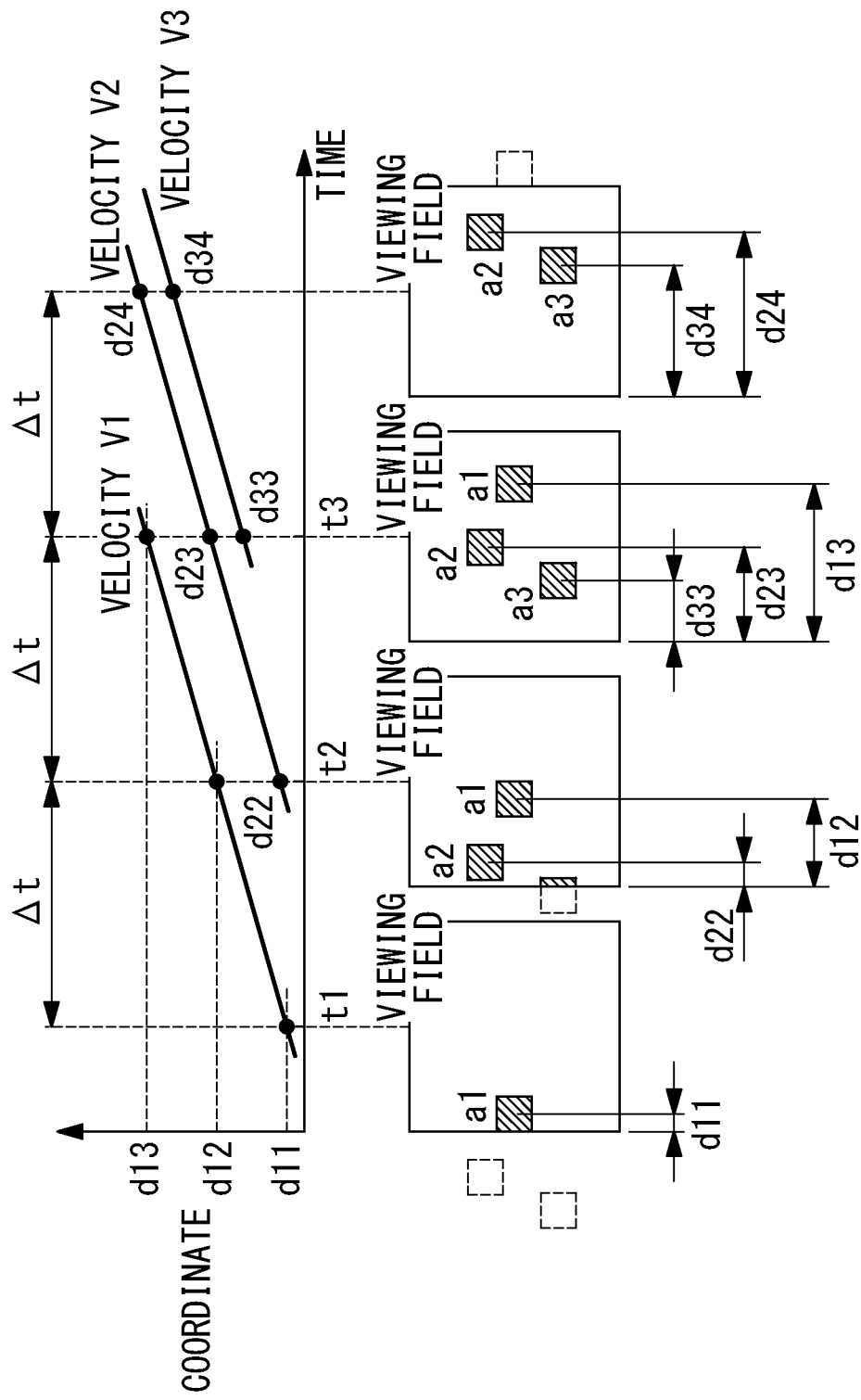
FIG. 4 is a diagram similar to FIG. 3 for a case in which images of a plurality of objects are captured in the same viewing field, in the robot system in FIG. 1.

In this embodiment, although the case in which the single article O is detected in the images has been described, alternatively, as shown in FIG. 4, it is possible to apply the present invention to a case in which a plurality of articles a1, a2, and a3 are simultaneously placed in the viewing field of the two-dimensional camera 4.

In other words, in the case in which the plurality of articles a1, a2, and a3 are recognized in the images, for the respective articles a1, a2, and a3, the identicalness with respect to the articles a1, a2, and a3 in the images acquired at different times may be determined, and the conveying velocity may be calculated by averaging velocities V1, V2, and V3 separately calculated on the basis of the movement distances among the articles a1, a2, and a3 determined to be the same.

In this case, the movement distances of the same articles a1, a2, and a3 are determined, respectively, on the basis of differences in coordinate positions d11, d12, and d13, coordinate positions d22, d23, and d24, and coordinate positions d33 and d34 of the gravity centers of the same articles a1, a2, and a3, which are calculated on the basis of the images acquired at different times t1, t2, and t3 separated by the predetermined time interval Δt.

Figure 5:
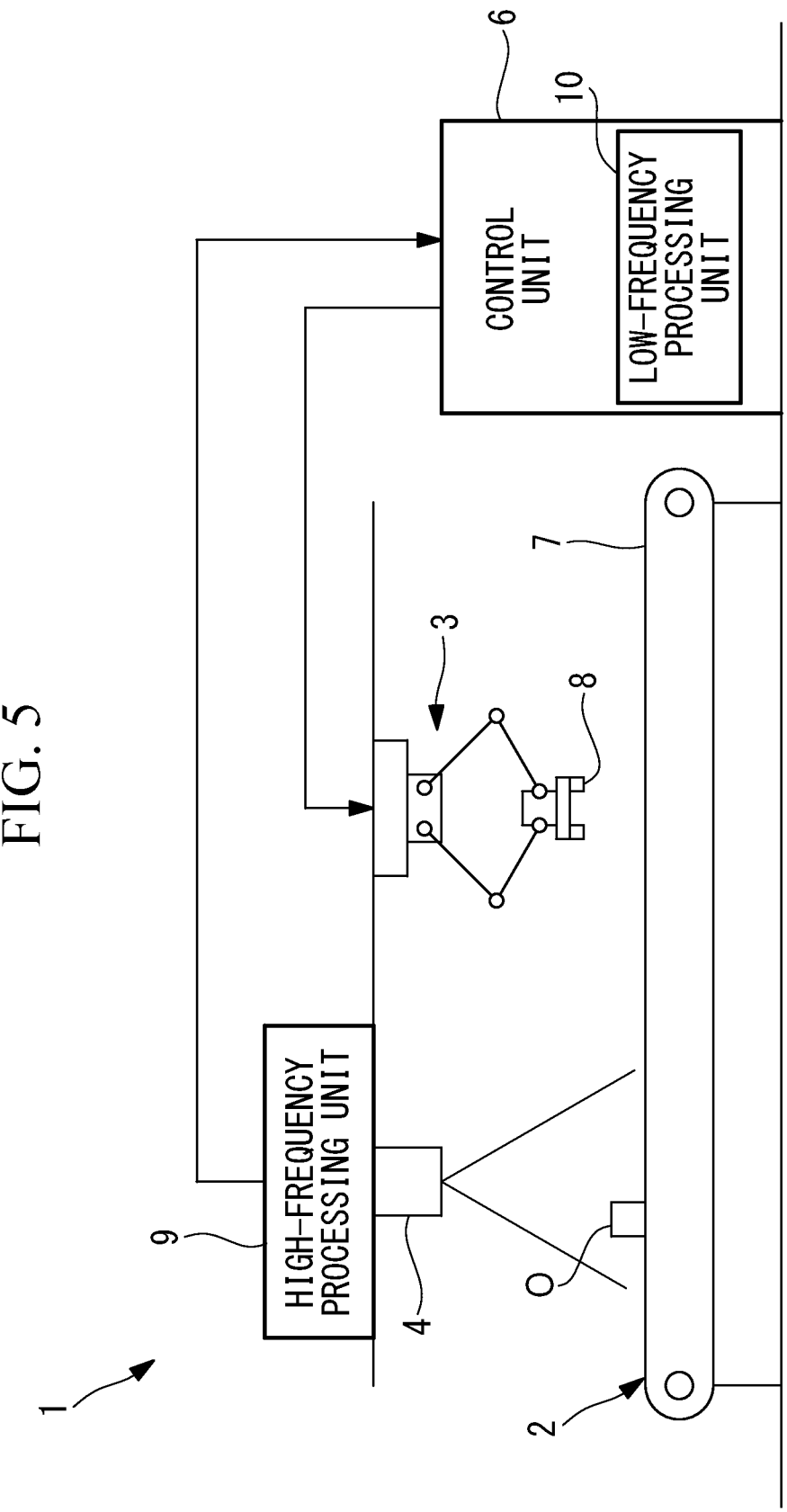
FIG. 5 is an overall configuration diagram showing a first modification of the robot system in FIG. 1.

Although this embodiment has been described in terms of an example in which the image-processing unit 5 that processes the images output from the two-dimensional camera 4 is provided as a separate component, alternatively, as shown in FIG. 5, the high-frequency processing unit 9 may be disposed in the two-dimensional camera 4 and the low-frequency processing unit 10 may be disposed in the control unit 6.

By building the high-frequency processing unit 9 into the two-dimensional camera 4, it is possible to more reliably detect, at high frequency, the velocity at which the article O is conveyed by the conveyor by preventing delays in communication. Because the low-frequency processing unit 10 does not require high-speed processing, it is preferable that the low-frequency processing unit 10 be built into the control unit 6. In the case in which the control frequency of the control unit 6 is lower than the first frequency of the high-frequency processing unit 9, it is preferable that the information about the positions of the gravity center of the article O be transmitted from the high-frequency processing unit 9 in units standardized by the control frequency of the control unit 6. For example, in the case in which the first frequency corresponds to 1 millisecond and the control frequency of the control unit 6 corresponds to 8 millisecond, eight items of information about the position of the gravity center corresponding to 8 millisecond in the high-frequency processing unit 9 may be transmitted all at once to the control unit 6 at a frequency corresponding to 8 millisecond.

Figure 6:
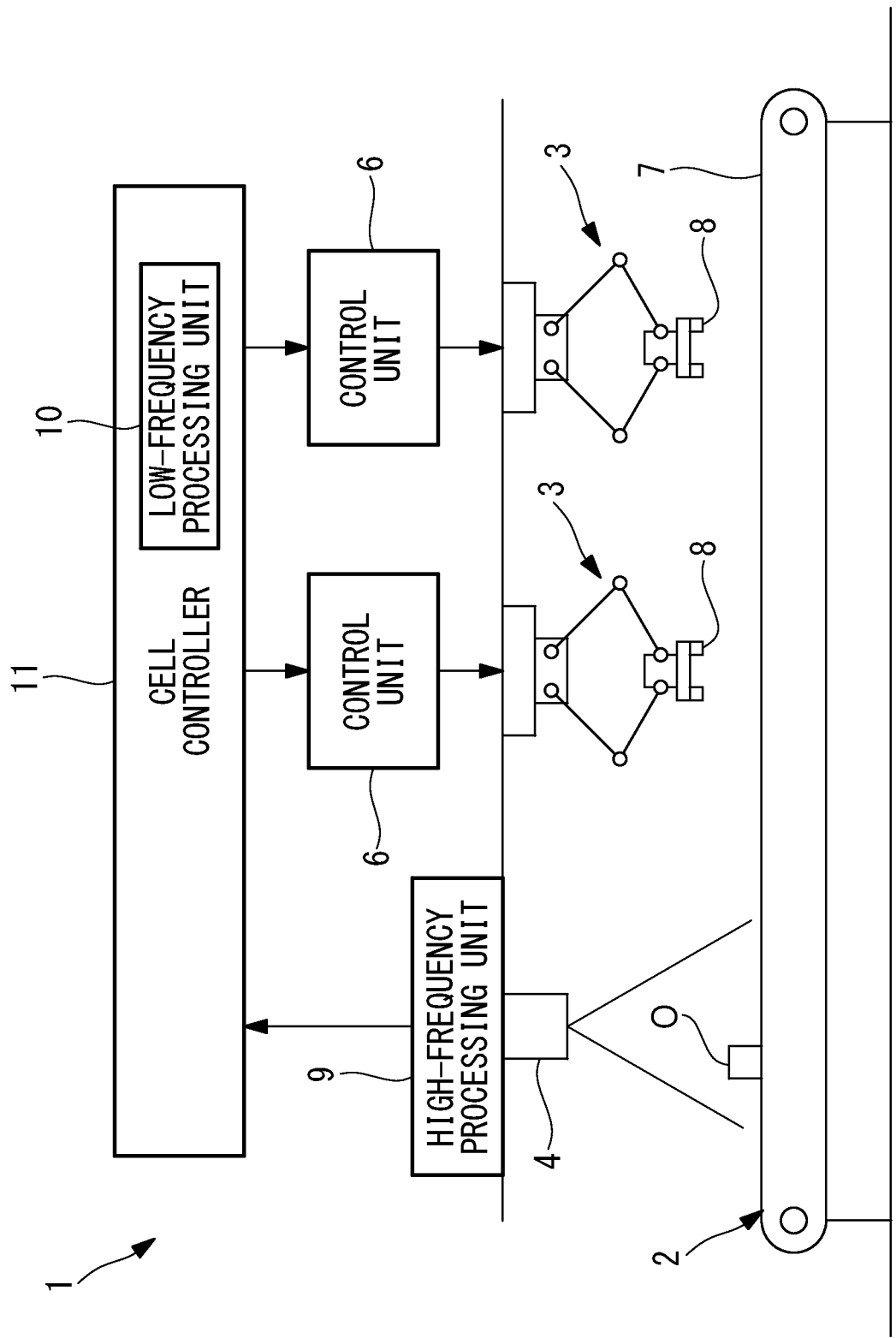
FIG. 6 is an overall configuration diagram showing a second modification of the robot system in FIG. 1.

In this embodiment, although an example in which the single robot 3 is controlled has been described, alternatively, as shown in FIG. 6, multiple robots 3 may be disposed along the conveying direction of the conveyor 2, and the control units 6 therefor may be connected to a high-level cell controller 11.

In the case where multiple robots 3 are used to perform work on the articles O being conveyed on the same conveyor 2, it is possible to manage, at one place, the conveying velocity of the conveyor 2 calculated on the basis of the images captured by the single two-dimensional camera 4.

In the case in which the conveying velocity of the conveyor 2 is managed by the control units 6 of the respective robots 3, it is necessary to synchronize the management thereof among the control units 6, and an error may occur due to the influence of delays in communication, etc.; however, by performing the management by means of the cell controller 11, it is possible to prevent the occurrence of such a problem.

Although an example in which, in order to further suppress the influence of delays in communication, the high-frequency processing unit 9 is disposed in the two-dimensional camera 4, and the low-frequency processing unit 10 is disposed in the cell controller 11 has been described, there is no limitation thereto. For example, the high-frequency processing unit 9 may also by disposed in the cell controller 11.

In this embodiment, although the case in which the article O being conveyed by the conveyor 2 is gripped and picked up has been described as an example, alternatively, the invention may be applied to a case in which other arbitrary processing is applied to the article O being conveyed.

Figure 7:
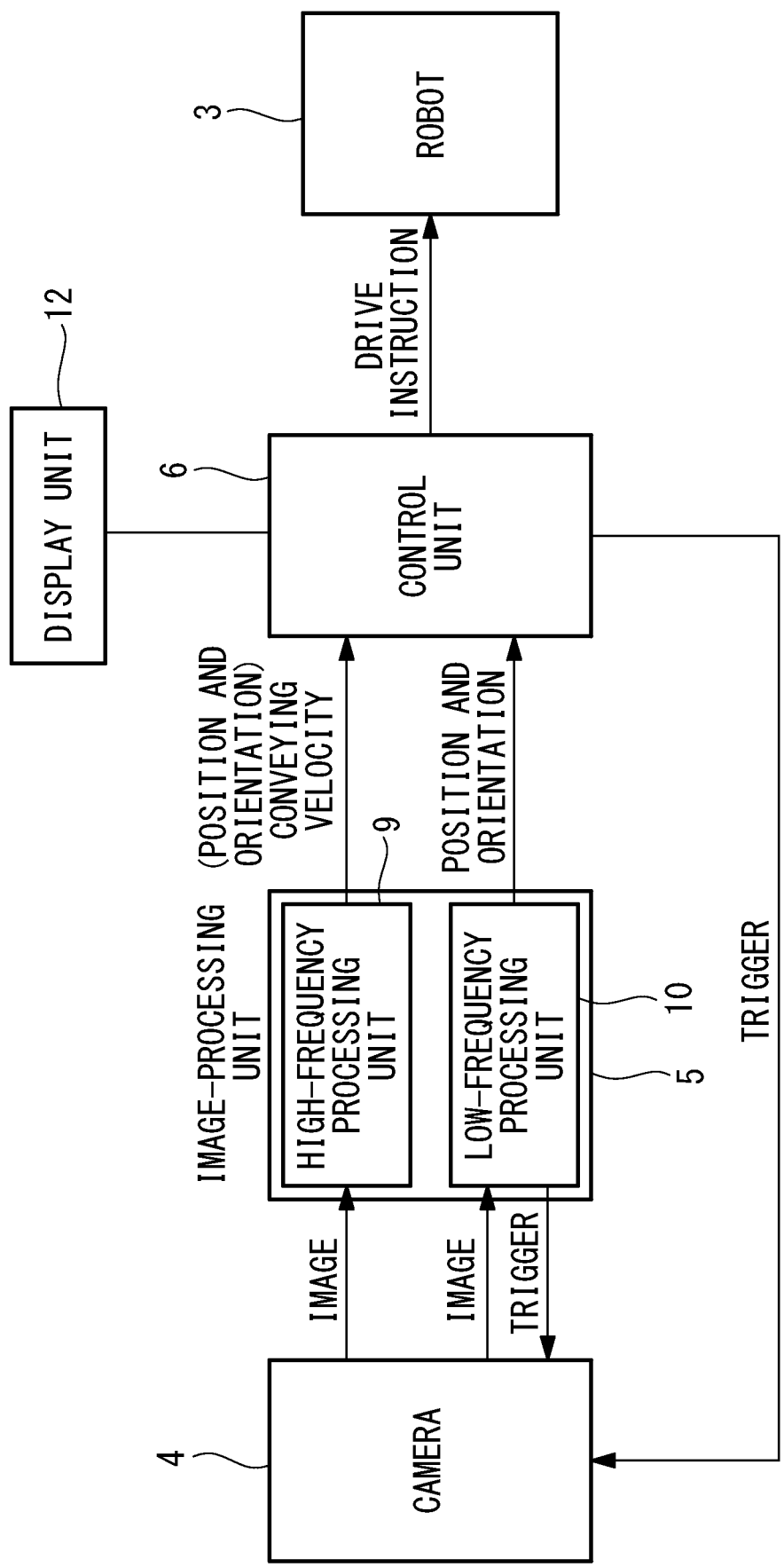
FIG. 7 is an overall configuration diagram showing a third modification of the robot system in FIG. 1.

As shown in FIG. 7, it is permissible to employ a configuration in which the control unit 6 outputs the triggers to the two-dimensional camera 4, as needed, the two-dimensional camera 4 outputs the images to the control unit 6 in accordance with the triggers, and the images may be displayed on the display unit 12 in the control unit 6, thus making it possible to check the images thereon.

Note that the control unit 6 may successively calculate the positions of the article O on the conveyor 2 based on the positions of the article O detected by the high-frequency processing unit 9 at a high frequency as descried above, and then the control unit 6 may output drive signals to the robot 3 in response to the positions of the article O obtained by the calculation. Also, the tracking for following the article O on the conveyor 2 may be executed on the basis of the positions of the article O by the aforementioned calculation. In this case, an effect which is the same as or similar to the aforementioned effect can also be achieved.

Further, the two-dimensional camera 4 may be attached to a distal end section of the robot 3. In this case, in the control unit 6, the reference coordinates system, which is the coordinates system used for control of the robot 3, and the position and the orientation (sensor coordinates system) of the two-dimensional camera 4 are made correspond to each other. With this configuration, the control unit 6 can know the position and the orientation of the two-dimensional camera 4 even when the position of the distal end section of the robot 3 is changed. Therefore, it is possible to precisely convert the detection results of the position and orientation of the article O based on the images acquired by the two-dimensional camera 4 into the position and orientation of the article O when they are seen from the reference coordinates system.

When the two-dimensional camera 4 is attached to the distal end section of the robot 3 as described above, the article O to which the robot 3 is following, articles O around the followed article O, and the like exist in the viewing field of the two-dimensional camera 4. In this case, an effect which is the same as or similar to the aforementioned effect can also be achieved because the position of the article O can be detected at the high frequency by the high-frequency processing unit 9.

Further, the two-dimensional camera 4 may be fixed at a vicinity of the robot 3 by using a frame, a stand, or the like, and the article O to which the robot 3 is following, articles O around the followed article O, and the like may exist in the viewing field of the two-dimensional camera 4. In this case, the reference coordinates system of the robot 3 and the position and the orientation (sensor coordinates system) of the two-dimensional camera 4 are made correspond to each other in the control unit 6, the control unit 6 can precisely convert the detection results of the position and orientation of the article O based on the images acquired by the two-dimensional camera 4 into the position and orientation of the article O when they are seen from the reference coordinates system. In this case, an effect which is the same as or similar to the aforementioned effect can also be achieved because the position of the article O can be detected at the high frequency by the high-frequency processing unit 9.

Although the aforementioned embodiment has a single two-dimensional camera 4 for detecting the article O, other two-dimensional cameras for inspection of articles O, arrival detection, and the like may be provided in the embodiment, and it is possible to perform the high frequency processing and the low frequency processing in a case in which a plurality of two-dimensional cameras 4 for detecting the articles O are employed.

Also, it is possible to convey the article O by using a conveying apparatus which moves the article O in a X axis direction and also in a Y axis direction. Note that the X axis and the Y axis horizontally extend, and the X axis intersects with the Y axis cross at right angles. In this case, the high-frequency processing unit 9 can detect the position of the article O at the high frequency, and the high-frequency processing unit 9 can calculate, at the high frequency, a velocity at which the articles O are conveyed in the X axis direction and a velocity at which the article O are conveyed in the Y axis direction. Therefore, it is possible to achieve an effect which is the same as or similar to the aforementioned effect. Note that a case in which the article O is moved in a Z axis direction is the same as or similar to this case.

It is also possible to convey the article O by using another robot instead of using the conveyor 2. Further, when the article O to be conveyed is a vehicle body of an automobile or the like, the article O may be conveyed by an engine, wheels, and the like. It is also possible to convey the article O by using a chuter, along which the articles O slip down, roll to go down, or fall by the gravity. In those cases, the other robot, the engine, the wheels, the chuter, or the like functions as the conveying apparatus.

The following aspects of the present invention are derived from the above disclosure.

An aspect of the present invention provides a robot system including: a conveying apparatus that conveys an object; a robot that performs a process on the object being conveyed by the conveying apparatus; a visual sensor that acquires visual information about the object being conveyed by the conveying apparatus; a high-frequency processing unit that detects at least one of a conveying velocity at which the object is being conveyed by the conveying apparatus and a position of the object by processing, at a first frequency, the visual information acquired by the visual sensor; a low-frequency processing unit that detects a position of the object by processing, at a second frequency that is lower than the first frequency, the visual information acquired by the visual sensor; and a control unit that controls the robot on the basis of at least one of the conveying velocity and the position of the object detected by the high-frequency processing unit, and on the basis of the position of the object detected by the low-frequency processing unit.

With this aspect, when a plurality of objects are being conveyed by the conveying apparatus, the visual sensor acquires visual information about the objects, the plurality of acquired pieces of the visual information are transmitted to the high-frequency processing unit and the low-frequency processing unit. In the high-frequency processing unit, by processing, at the first frequency, the visual information acquired by the visual sensor, either conveying velocities of the objects, which can be calculated with a relatively low processing load, or positions of the objects are detected at the first frequency that is a high frequency. By doing so, it is possible to detect either the conveying velocities or the positions of the objects at a resolution that is equivalent to that of the encoder.

On the other hand, in the low-frequency processing unit, because the visual information is processed at the second frequency that is lower than the first frequency, it is possible to execute processing that requires an enormous amount of calculation, and thus, it is possible to detect, with high precision, the position of the object.

By doing so, it is possible to precisely apply a process to the object being conveyed by the conveying apparatus, by means of the robot on the basis of the position of the object detected by the low-frequency processing unit, by causing the robot to follow the object being conveyed by the conveying apparatus by moving the robot on the basis of either one of the conveying velocity or the position of the object detected by the high-frequency processing unit.

In the above-described aspect, the high-frequency processing unit may process, at the first frequency, a portion of the visual information acquired by the visual sensor.

By doing so, it is possible to facilitate detection of the moving velocity of the object at the high frequency by reducing the amount of the visual information that is processed by the high-frequency processing unit.

In the above-described aspect, the visual sensor may acquire an image of the object on the conveying apparatus as the visual information.

By doing so, it is possible to detect, at the first frequency, the conveying velocity of the object by processing the images acquired by the visual sensor at the different times, and, by applying, at the second frequency, processing that requires an enormous amount of calculation, such as pattern matching or the like, to the images of the object acquired by the visual sensor, it is possible to detect, with high precision, the position and orientation of the object.

In the above-described aspect, the conveying apparatus may be provided with a mark that is moved at a velocity which is the same as that of the object.

By doing so, even in a state in which the object is not conveyed by the conveying apparatus, it is possible to precisely detect the conveying velocity of the object by acquiring the visual information about the mark being moved by the conveying apparatus.

In the above-described aspect, the high-frequency processing unit may detect the conveying velocity of the object, a rough position thereof, and an orientation thereof.

By doing so, the high-frequency processing unit detects the rough position and orientation of the object in addition to the conveying velocity thereof. With the high-frequency processing unit, although it is difficult to detect, with high precision, at a high frequency, the position and orientation for processing the visual information, it is possible to detect the rough position and orientation, and thus, it is possible to enhance the operational efficiency by using said information as information for an initial operation of the robot that applies processing to the object.

In the above-described aspect, the robot may perform work, following the object which is being conveyed by the conveying apparatus.

By doing so, by causing the robot to be moved so as to follow the object being conveyed by using the conveying velocity of the object detected by the high-frequency processing unit, and by using the position and orientation of the object precisely detected by the low-frequency processing unit, it is possible to remove the object being conveyed from the conveying apparatus without an error.

In the above-described aspect, the visual sensor may output, based on a trigger externally provided thereto, the visual information acquired immediately before or immediately after receiving the trigger.

By doing so, on the basis of the trigger from the high-frequency processing unit, the low-frequency processing unit, or other equipment that is external to the visual sensor, the visual information is output, as needed, and it is possible to use said information for detecting, with high precision, the position and orientation, adjusting the visual sensor, checking the working state thereof, etc.

The aforementioned aspects afford an advantage in that it is possible to detect, on the basis of visual information detected by a visual sensor, at least one of the conveying velocity at which an object is conveyed by a conveying apparatus and the position of the object, and precisely detect the position of the object, thus making it possible to perform, by means of a robot, appropriate work on the object being conveyed by the conveying apparatus.

What is claimed is:

1. A robot system comprising:
    a conveying apparatus that conveys an object;
    a robot that performs a process on the object being conveyed by the conveying apparatus;
    a visual sensor that acquires visual information about the object being conveyed by the conveying apparatus;
    a high-frequency processing unit that detects at least one of a conveying velocity at which the object is being conveyed by the conveying apparatus and a position of the object by processing, at a first frequency, the visual information acquired by the visual sensor;
    a low-frequency processing unit that detects a position of the object by processing, at a second frequency that is lower than the first frequency, the visual information acquired by the visual sensor; and
    a control unit that controls the robot on the basis of at least one of the conveying velocity and the position of the object detected by the high-frequency processing unit, and on the basis of the position of the object detected by the low-frequency processing unit.

2. The robot system according to claim 1, wherein the high-frequency processing unit processes, at the first frequency, a portion of the visual information acquired by the visual sensor.

3. The robot system according to claim 1, wherein the visual sensor acquires an image of the object on the conveying apparatus as the visual information.

4. The robot system according to claim 1, wherein the conveying apparatus is provided with a mark that is moved at a velocity which is the same as that of the object.

5. The robot system according to claim 1, wherein the robot performs work, following the object which is being conveyed by the conveying apparatus.

6. The robot system according to claim 1, wherein the visual sensor outputs, based on a trigger externally provided thereto, the visual information acquired immediately before or immediately after receiving the trigger.

* * * * *